(12) United States Patent
Vathauer et al.

(10) Patent No.: US 6,812,166 B2
(45) Date of Patent: Nov. 2, 2004

(54) THERMOPLASTIC COMPOSITIONS WITH IMPROVED LOW-TEMPERATURE IMPACT STRENGTH

(75) Inventors: Marc Vathauer, Köln (DE); Holger Warth, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 44 days.

(21) Appl. No.: 10/413,159

(22) Filed: Apr. 14, 2003

(65) Prior Publication Data

US 2003/0199622 A1 Oct. 23, 2003

(30) Foreign Application Priority Data

Apr. 19, 2002 (DE) .......................................... 102 17 519

(51) Int. Cl.[7] .......................... H01L 21/00; C08K 3/34; C08K 11/00
(52) U.S. Cl. ....................... 438/800; 524/313; 524/442; 524/456; 524/493
(58) Field of Search ........................................ 438/800

(56) References Cited

U.S. PATENT DOCUMENTS

| 4,550,138 | A | | 10/1985 | Paddock et al. ............... 525/67 |
|---|---|---|---|---|
| 5,091,461 | A | | 2/1992 | Skochdopole ................ 524/493 |
| 5,965,655 | A | | 10/1999 | Mordecai et al. ............ 524/456 |
| 6,084,012 | A | * | 7/2000 | Gareiss et al. ................. 524/80 |
| 6,355,767 | B1 | | 3/2002 | Takagi ......................... 528/196 |
| 6,362,269 | B1 | | 3/2002 | Ishihata et al. .............. 524/449 |
| 2002/0137822 | A1 | * | 9/2002 | Seidel et al. ................. 524/127 |
| 2003/0216506 | A1 | * | 11/2003 | Damman et al. .............. 525/66 |

FOREIGN PATENT DOCUMENTS

| DE | 100 54 274 | 5/2002 |
|---|---|---|
| DE | 101 52 317 | 5/2003 |
| EP | 1 191 065 | 3/2002 |
| JP | 50-109247 | 8/1975 |
| JP | 58-98354 | 6/1983 |
| WO | 98/51737 | 11/1998 |

* cited by examiner

*Primary Examiner*—David Nelms
*Assistant Examiner*—Thao P. Le
(74) *Attorney, Agent, or Firm*—Joseph C. Gil; Aron Preis

(57) ABSTRACT

A thermoplastic molding composition having improved impact strength at low temperatures is disclosed. The composition contains A) polycarbonate and/or polyester carbonate B) a graft polymer based on ethylene-α-olefin rubber as graft base, C) wollastonite having carbon content greater than 0.1% relative to the weight of the wollastonite and D) at least one of triglyceride, aliphatic saturated hydrocarbon and aliphatic unsaturated hydrocarbon.

15 Claims, No Drawings

THERMOPLASTIC COMPOSITIONS WITH IMPROVED LOW-TEMPERATURE IMPACT STRENGTH

FIELD OF THE INVENTION

The invention concerns thermoplastic molding compositions and more particularly compositions that are reinforced with wollastonitemold.

SUMMARY OF THE INVENTION

A thermoplastic molding composition having improved impact strength at low temperatures is disclosed. The composition contains A) polycarbonate and/or polyester carbonate B) a graft polymer based on ethylene-α-olefin rubber as graft base, C) wollastonite having carbon content greater than 0.1% relative to the weight of the wollastonite and D) at least one of triglyceride, aliphatic saturated hydrocarbon and aliphatic unsaturated hydrocarbon.

BACKGROUND OF THE INVENTION

It is known that blends containing AES rubbers and AES resins are weather resistant, but their mechanical properties in the low temperature range are unsatisfactory. At temperatures below 0° C. they become brittle and display unsatisfactory impact strengths and this hinders the use of these molding compositions at lower temperatures. In particular, the notch impact strength of AES blends in the low temperature range is poor, especially in comparison to acrylonitrile/butadiene/styrene (ABS) blends.

JP-A 50 109 247 describes polycarbonate blends with AES containing 0.1 to 10 wt. % paraffin oil. JP-A 58 098 354 describes polycarbonate blends with AES and 0.5 to 20 wt. % plasticisers for vinyl polymers. It is not known that the use of special additives, which concentrate specifically in the flexible phase of the blend, leads to a pronounced improvement in low-temperature properties in polycarbonate/AES blends. The compositions thus described display an inadequate rigidity level at room temperature.

Mineral-filled polycarbonate/AES molding compositions are likewise known.

EP-B 0 391 413 describes PC/AES compositions with a low linear and thermal expansion quotient and high impact strength and heat resistance, which contain 4 to 18 wt. % of an inorganic filler, the particles of which have an average diameter/thickness ratio of 4 to 24. They are therefore platelet-like minerals such as talc or mica.

PC/AES molding compositions with fibrous mineral fillers are also known.

PC/AES compositions with wollastonites having an average fibre length of 5 to 25 μm and an average particle diameter of 0.1 to 10 μm are claimed in U.S. Pat. No. 5,965,655. The molding compositions are characterized in particular by improved surface characteristics ("class A surface") and a low coefficient of thermal expansion. The wollastonites that are preferably used display an average aspect ratio (i.e. a ratio of fibre length to fibre diameter) of up to 6. Molding compositions with such wollastonites generally have an inadequate rigidity, i.e. too low a tensile/flexural modulus. Furthermore, these molding compositions display brittle fracture characteristics at room temperature.

Compositions consisting of 65 to 85 parts by weight of aromatic polycarbonate, 10 to 50 parts by weight of rubber-modified graft copolymer and 1 to 15 parts by weight of a mineral filler having a maximum characteristic expansion of 0.1 to 30 μm are claimed in WO 98/51737. Talc and wollastonite are disclosed as such fillers. Such PC-rich molding compositions display an inadequate low-temperature impact strength.

EP-A 1 038 920 describes molding compositions containing a special melt polycarbonate, AES and 15 parts by weight of a wollastonite having a particle diameter of 4 μm and an aspect ratio L/D=20. Such molding compositions display an inadequate low-temperature impact strength.

The unpublished German patent application 10 152 317.3 describes impact-modified polycarbonate compositions reinforced with wollastonite of a particular specification. Additives according to component D) of the present invention are not mentioned.

The unpublished patent application 100 542 743.3 describes polycarbonate/AES blends that do contain additives according to component D) of the present invention, but wollastonites of a particular specification are not mentioned.

The object of the present invention was to provide a weather resistant, impact-modified polycarbonate blend that displays notch impact resistant characteristics, a high modulus of elasticity and a low coefficient of thermal expansion, even at low temperatures, and which is therefore very suitable for exterior car body applications in particular.

DETAILED DESCRIPTION OF THE INVENTION

It was found that a composition comprising polycarbonate, graft polymer based on ethylene-α-olefins as graft base, an additive selected in particular from triglycerides, aliphatically saturated and/or unsaturated hydrocarbons and mixtures thereof, which is characterized in that it concentrates specifically in the flexible phase of the blend, and a wollastonite with a defined carbon content, displays the desired properties.

It was further found that such molding compositions display a good modulus of elasticity, a good low-temperature notch impact resistance, a high elongation at break and good processing characteristics.

It was found that the addition of special additives, such as triglycerides and/or special hydrocarbons, to compositions containing AES in combination with special mineral fillers, improves the low-temperature impact strength.

The invention provides compositions comprising:

A) polycarbonate and/or polyester carbonate
B) graft polymer based on ethylene-α-olefin rubber as graft base,
C) wollastonite with a carbon content relative to the wollastonites of greater than 0.1 wt. %, preferably 0.2 to 2 wt. %, particularly preferably 0.3 to 1 wt. %, most particularly preferably 0.3 to 0.6 wt. %, determined by elemental analysis and
D) at least one additive, selected from triglycerides, aliphatically saturated and aliphatically unsaturated hydrocarbons.

Compositions comprising:

A) 30 to 85, preferably 35 to 80, particularly preferably 40 to 70 parts by weight of polycarbonate and/or polyester carbonate,
B) 1 to 50, preferably 2 to 35, particularly preferably 3 to 30, in particular 3 to 25 parts by weight of graft polymer with ethylene-α-olefin rubber as graft base, C) 2 to 20, preferably 3 to 18, particularly preferably 4 to 15, in particular 6 to 12 parts by weight, most particularly preferably 7 to 10 parts by weight of wollastonite with a carbon content relative to the wollastonites of greater than 0.1 wt. %, preferably 0.2 to 2 wt. %, particularly preferably 0.3 to 1 wt. %, most particularly preferably 0.3 to 0.6 wt. %, determined by elemental analysis, and D) 0.1 to 25, preferably 1 to 15, in particular 1 to 10, most particularly preferably 1.5 to 8 parts by weight of at least one additive selected from the group of triglycerides, aliphatically saturated and aliphatically unsaturated hydrocarbons, wherein the sum of the parts by weight of all components equals 100, are preferred.

The composition may contain other components, for example vinyl (co)polymers, polyalkylene terephthalates, flame retardants and polymer additives.

These components and other components that maybe used in the compositions according to the invention are described by way of example below.

Component A

Aromatic polycarbonates and/or aromatic polyester carbonates according to component A that are suitable according to the invention are known from the literature or maybe prepared by methods known from the literature (for the preparation of aromatic polycarbonates see for example Schnell, "Chemistry and Physics of Polycarbonates", Interscience Publishers, 1964, and DE-AS 1 495 626, DE-A 2 232 877, DE-A 2 703 376, DE-A 2 714 544, DE-A 3 000 610, DE-A 3 832 396; for the preparation of aromatic polyester carbonates, e.g. DE-A 3 077 934).

Aromatic polycarbonates are prepared for example by reacting diphenols with carbonic acid halides, preferably phosgene, and/or with aromatic dicarboxylic acid dihalides, preferably benzenedicarboxylic acid dihalides, by the interfacial polycondensation process, optionally using chain terminators, for example monophenols, and optionally using trifunctional or polyfunctional branching agents, for example triphenols or tetraphenols.

Diphenols for the preparation of the aromatic polycarbonates and/or aromatic polyester carbonates are preferably those having the formula (I)

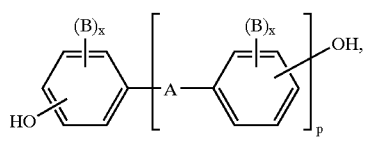

(I)

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which other aromatic rings optionally containing heteroatoms maybe condensed, or a radical having the formula (II) or (III):

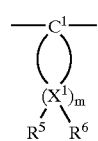

(II)

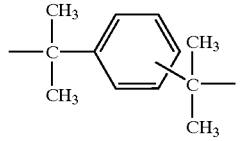

(III)

B is $C_1$ to $C_{12}$ alkyl, preferably methyl, halogen, preferably chlorine and/or bromine x is mutually independently 0, 1 or 2, p is 1 or 0, and $R^5$ and $R^6$ maybe individually selected for each $X^1$ and mutually independently denote hydrogen or $C_1$ to $C_6$ alkyl, preferably hydrogen, methyl or ethyl, $X^1$ denotes carbon and m denotes a whole number from 4 to 7, preferably 4 or 5, with the proviso that in at least one $X^1$ atom $R^5$ and $R^6$ are both alkyl.

Preferred diphenols are hydroquinone, resorcinol, dihydroxydiphenols, bis(hydroxyphenyl)-$C_1$–$C_5$-alkanes, bis(hydroxyphenyl)-$C_5$–$C_6$-cycloalkanes, bis (hydroxyphenyl) ethers, bis(hydroxyphenyl) sulfoxides, bis (hydroxyphenyl) ketones, bis(hydroxyphenyl) sulfones and α,α-bis(hydroxyphenyl)diisopropyl benzenes along with their ring-brominated and/or ring-chlorinated derivatives.

Particularly preferred diphenols are 4,4'-dihydroxydiphenyl, bisphenol A, 2,4-bis-(4-hydroxyphenyl)-2-methyl butane, 1,1-bis-(4-hydroxyphenyl)cyclohexane, 1,1-bis-(4-hydroxyphenyl-3,3,5-trimethyl cyclohexane, 4,4'-dihydroxydiphenyl, sulfide, 4,4'-dihydroxydiphenyl sulfone and dibrominated and tetrabrominated or chlorinated derivatives thereof such as e.g. 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-bis-(4-hydroxyphenyl)propane (bisphenol A) is especially preferred.

The diphenols may be used individually or in any mixture whatsoever. The diphenols are known from the literature or may be obtained by methods known from the literature.

Suitable chain terminators for the preparation of the thermoplastic, aromatic polycarbonates are for example phenol, p-chlorophenol, p-tert.-butyl phenol or 2,4,6-tribromophenol, as well as long-chain alkyl phenols such as 4-(1,3-tetramethyl butyl)phenol according to DE-A 2 842 005 or monoalkyl phenol or dialkyl phenols having a total of 8 to 20 carbon atoms in the alkyl substituents, such as 3,5-di-tert.-butyl phenol, p-iso-octyl phenol, p-tert.-octyl phenol, p-dodecyl phenol and 2-(3,5-dimethyl heptyl)phenol and 4-(3,5-dimethyl heptyl)phenol. The amount of chain terminators to be used is generally between 0.5 mol % and 10 mol %, relative to the molar sum of diphenols used in each case.

The thermoplastic, aromatic polycarbonates have average weight-average molecular weights ($M_w$, measured e.g. by ultracentrifuge or light-scattering measurement) of 10,000 to 200,000, preferably 15,000 to 80,000.

The thermoplastic, aromatic polycarbonates may be branched by known means, and preferably by the incorporation of 0.05 to 2.0 mol %, relative to the sum of diphenols used, of trifunctional or polyfunctional compounds, for example those having three and more phenolic groups.

Both homopolycarbonates and copolycarbonates are suitable. 1 to 25 wt. %, preferably 2.5 to 25 wt. %, relative to the total amount of diphenols to be used, of polydiorganosiloxanes having hydroxyaryloxy terminal groups may also be used in the production of copolycarbonates according to the invention as component A. These are known (U.S. Pat. No. 3,419,634) and may be produced by methods known from the literature. The production of polydiorganosiloxane-containing copolycarbonates is described in DE-A 3 334 782.

In addition to the bisphenol A homopolycarbonates, preferred polycarbonates are the copolycarbonates of bisphenol A having up to 15 mol %, relative to the molar sums of diphenols, of other diphenols cited as being preferred or particularly preferred, in particular 2,2-bis-(3,5-dibromo-4-hydroxyphenyl)propane.

Aromatic dicarboxylic acid dihalides for the production of aromatic polyester carbonates are preferably the di-acid dichlorides of isophthalic acid, terephthalic acid, diphenyl ether-4,4'-dicarboxylic acid and naphthaline-2,6-dicarboxylic acid.

Mixtures of the di-acid dichlorides of isophthalic acid and terephthalic acid in a ratio between 1:20 and 20:1 are particularly preferred.

In the production of polyester carbonates a carbonic acid halide, preferably phosgene, is also incorporated as a bifunctional acid derivative.

Examples of chain terminators for the production of aromatic polyester carbonates also include, in addition to the monophenols already cited, chloroformic acid esters thereof and the acid chlorides of aromatic monocarboxylic acids, which may optionally be substituted by $C_1$ to $C_{22}$ alkyl groups or by halogen atoms, along with aliphatic $C_2$ to $C_{22}$ monocarboxylic acid chlorides.

The quantity of chain terminators in each case is 0.1 to 10 mol %, relative to moles of diphenol in the case of phenolic chain terminators and to moles of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be both linear and branched by known means (see DE-A 2 940 024 and DE-A 3 007 934 in this connection).

Examples of branching agents that may be used include trifunctional or polyfunctional carboxylic acid chlorides, such as trimesic acid trichloride, cyanuric acid trichloride, 3,3'-4,4'-benzophenone tetracarboxylic acid tetrachloride, 1,4,5,8-naphthaline tetracarboxylic acid tetrachloride or pyromellitic acid tetrachloride, in quantities of 0.01 to 1.0 mol % (relative to dicarboxylic acid dichlorides used) or trifunctional or polyfunctional phenols, such as phloroglucinol, 4,6-dimethyl-2,4,6-tri-(4-hydroxyphenyl)heptene-2, 4,4-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenyl methane, 2,2-bis-[4,4-bis-(4-hydroxyphenyl)cyclohexyl]propane, 2,4-bis-(4-hydroxyphenyl isopropyl)phenol, tetra-(4-hydroxyphenyl) methane, 2,6-bis-(2-hydroxy-5-methylbenzyl)-4-methyl phenol, 2-(4-hydroxyphenyl)-2-(2,4-dihydroxyphenyl) propane, tetra-(4-[4-hydroxyphenyl isopropyl]phenoxy) methane, 1,4-bis-[4,4'-dihydroxytriphenyl)methyl]benzene, in quantities of 0.01 to 1.0 mol %, relative to diphenols used. Phenolic branching agents may be included with the diphenols, acid chloride branching agents may be introduced together with the acid dichlorides.

The proportion of carbonate structural units in the thermoplastic, aromatic polyester carbonates may vary widely. The proportion of carbonate groups is preferably up to 100 mol %, in particular up to 80 mol %, particularly preferably up to 50 mol %, relative to the sum of ester groups and carbonate groups. Both the ester and the carbonate component of the aromatic polyester carbonates may be in the form of blocks or randomly distributed in the polycondensate.

The relative solution viscosity ($\eta_{rel}$) of the aromatic polycarbonates and polyester carbonates is in the range from 1.18 to 1.4, preferably 1.20 to 1.32 (measured in solutions of 0.5 g polycarbonate or polyester carbonate in 100 ml methylene chloride solution at 25° C.).

The thermoplastic, aromatic polycarbonates and polyester carbonates may be used alone or in any mixture with one another.

Component B

The graft polymers used according to the invention are those having EP(D)M rubbers as graft base. The glass transition temperature of such rubbers may be −40 to −60° C. and they have only a small number of double bonds, for example fewer than 20 per 1000 carbon atoms. Copolymers or terpolymer containing at least one ethylene and one (α-olefin and preferably having only a small number of double bonds may be cited by way of example, reference being made in this respect to EP-A 163 411 and 244 857. Preferred are those produced by polymerisation of at least 30 parts by weight of ethylene, at least 30 parts by weight of α-olefin, preferably aliphatic $C_3$–$C_{20}$, preferably $C_3$–$C_{10}$ hydrocarbons that are unsaturated in alpha, such as for example and particularly preferably propylene, 1-butene, octene, hexene, and optionally 0.5 to 15 parts by weight of a non-conjugated diolefinic component, whereby the sum of the parts by weight equals 100. Diolefins having at least five carbon atoms, such as 5-ethylidene norbornene, dicyclopentadiene, 2,2,1-dicyclopentadiene and 1,4-hexadiene, are generally used as the terpolymer component. Polyallylenamers such as polypentamer, polyoctenamer, polydodecanamer or mixtures thereof are also suitable. Finally, partially hydrogenated polybutadiene rubbers in which at least 70% of the residual double bonds are hydrogenated are also suitable. EP(D)M rubbers generally have a Mooney viscosity ML-$_{1-4}$ (100° C.) of 25 to 120. They are available commercially.

Furthermore, the polyolefin elastomers or ethene/octene polyolefins sold under the trade name Engage may also be used in the same way.

Vinyl aromatics and/or ring-substituted vinyl aromatics and vinyl cyanides and/or (meth)acrylic acid ($C_1$–$C_8$) alkyl esters are grafted.

Particularly preferred are graft polymers of:
1) 5 to 95 wt. %, preferably 20 to 80 wt. %, in particular 30 to 50 wt. %, of at least one vinyl monomer on
2) 95 to 5 wt. %, preferably 80 to 20, in particular 70 to 20 wt. %, of one or more graft bases based on ethylene-α-olefin rubber and having glass transition temperatures in the rubber component of <0° C., preferably <−20° C., particularly preferably <−40° C., in particular based on EP(D)M rubbers.

The graft base 2) generally has an mean particle size ($d_{50}$ value) of 0.05 to 5 μm, preferably 0.10 to 2 μm, particularly preferably 0.15 to 1 μm.

Monomers 1) are preferably mixtures of:
1.1) 50 to 99, preferably 60 to 80 wt. % of vinyl aromatics and/or ring-substituted vinyl aromatics such as styrene, α-methyl styrene, p-methyl styrene, p-chlorostyrene and/or (meth)acrylic acid ($C_1$–$C_8$) alkyl esters such as methyl methacrylate and ethyl methacrylate and
1.2) 1 to 50, preferably 40 to 20 wt. % of vinyl cyanides (unsaturated nitriles such as acrylonitrile and methacrylonitrile) and/or (meth)acrylic acid ($C_1$–$C_8$) alkyl esters such as methyl methacrylate, n-butyl acrylate, t-butyl acrylate, and/or derivatives, such as anhydrides and imides of unsaturated carboxylic acids, for example maleic anhydride and N-phenyl maleinimide.

Preferred monomers 1.1 are selected from at least one of the monomers styrene, α-methyl styrene and methyl methacrylate, preferred monomers 1.2 are selected from at least one of the monomers acrylonitrile, maleic anhydride and methyl methacrylate.

The graft polymer based on EP(D)M may be prepared for example by producing a solution of the EP(D)M elastomer in the monomer mixture and optionally inert solvents and performing the graft reaction using radical starters such as azo compounds or peroxides at elevated temperatures. The processes in DE-AS 23 02 014 and DE-A 25 33 991 maybe cited by way of example. It is also possible to operate in suspension in accordance with U.S. Pat. No. 4,202,948 or in bulk.

Component C

Wollastonites for use according to the invention having the afore-mentioned carbon contents are commercially available, for example under the trade name Nyglos® from NYCO Minerals Inc., Willsboro, N.Y., USA and product codes Nyglos® 4-10992 or Nyglos® 5-10992.

The carbon content is determined by elemental analysis.

Preferred wollastonites have an average aspect ratio of >6, in particular ≧7, and an average fibre diameter of 1 to 15 μm, preferably 2 to 10 μm, in particular 4 to 8 μm.

The average aspect ratio within the meaning of the invention is the ratio of the average length of the fibres to the average diameter.

Component D

The effective additives according to the invention include all oils and additives that increase the low-temperature impact strength of the blends in the manner described above. Particularly suitable are triglycerides, aliphatic saturated and/or unsaturated hydrocarbons and mixtures thereof. Triglycerides for use according to the invention are preferably those consisting of higher fatty acids with 12 to 35, preferably 14 to 30 carbon atoms. The triglycerides maybe vegetable, animal and synthetic fats and oils. Suitable vegetable oils are linseed oil, castor oil, rapeseed oil, maize oil and wheat germ oil, for example.

Aliphatic saturated and/or unsaturated hydrocarbons that are suitable according to the invention are those having number average molecular weights of at least 400 and mixtures thereof. The hydrocarbons may for example and preferably display number average molecular weights of 300 to 50,000, particularly preferably 500 to 30,000, in particular 600 to 10,000. Especially effective oils have a branched structure, whereby short-chain branched hydrocarbon oils are most particularly effective. Particularly suitable are polybutenes or polyisobutenes, particularly if they are characterized by a high content, preferably >50%, in particular >60%, relative to the terminal groups, of vinylidene terminal groups.

Also suitable according to the invention are low-molecular EPDM oils. Low-molecular EPDM oils are in particular those having molecular weights of 1000 to 30,000, preferably 5000 to 10,000, and mixtures thereof. Particularly preferred are EPDM oils having molecular weights of approximately 5600 to 8800.

The additives for use according to the invention may be used in quantities of 0.1 to around 25 wt. %, for example around 1 to 10 wt. %, relative to the mass of the blends.

Component E

Other components that may also be included in the composition are: one or more thermoplastic vinyl (co) polymers E.1 and/or polyalkylene terephthalates E.2.

Suitable vinyl (co)polymers E.1 are polymers of at least one monomer from the group of vinyl aromatics, vinyl cyanides (unsaturated nitriles), (meth)acrylic acid ($C_1$ to $C_8$) alkyl esters, unsaturated carboxylic acids and derivatives (such as anhydrides and imides) of unsaturated carboxylic acids. Particularly suitable are (co)polymers consisting of:

E.1.1 50 to 99, preferably 60 to 80 wt. % of vinyl aromatics and/or ring-substituted vinyl aromatics, such as e.g. styrene, α-methyl styrene, p-methyl styrene, p-chlorostyrene, and/or methacrylic acid ($C_1$–$C_8$) alkyl esters, such as methyl methacrylate, ethyl methacrylate, and E.1.2 1 to 50, preferably 20 to 40 wt. % of vinyl cyanides (unsaturated nitriles) such as acrylonitrile and methacrylonitrile and/or (meth)acrylic acid ($C_1$–$C_8$) alkyl esters (such as methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl maleinimide).

The (co)polymers E.1 are resinous, thermoplastic and rubber-free.

The copolymer of E.1.1 styrene and E.1.2 acrylonitrile is particularly preferred.

The (co)polymers according to E.1 are known and may be produced by radical polymerisation, in particular by emulsion, suspension, solution or bulk polymerisation. The (co)polymers preferably have average molecular weights $M_w$ (weight average, determined by light scattering or sedimentation) of between 15,000 and 200,000.

The polyalkylene terephthalates in component E.2 are reaction products of aromatic dicarboxylic acids or reactive derivatives thereof, such as dimethyl esters or anhydrides, and aliphatic, cycloaliphatic or araliphatic diols and mixtures of these reaction products.

Preferred polyalkylene terephthalates contain at least 80 wt. %, preferably at least 90 wt. %, relative to the dicarboxylic acid component, of terephthalic acid radicals and at least 80 wt. %, preferably at least 90 mol %, relative to the diol component, of ethylene glycol and/or butanediol-1,4 radicals.

In addition to terephthalic acid radicals, the preferred polyalkylene terephthalates may contain up to 20 mol %, preferably up to 10 mol %, of radicals of other aromatic or cycloaliphatic dicarboxylic acids with 8 to 14 C atoms or aliphatic dicarboxylic acids with 4 to 12 C atoms, such as radicals of phthalic acid, isophthalic acid, naphthaline-2,6-dicarboxylic acid, 4,4'-diphenyl dicarboxylic acid, succinic acid, adipic acid, sebacic acid, azelaic acid, cyclohexane diacetic acid.

In addition to ethylene glycol or butanediol-1,4 radicals, the preferred polyalkylene terephthalates may contain up to 20 mol %, preferably up to 10 mol %, of other aliphatic diols with 3 to 12 C atoms or cycloaliphatic diols with 6 to 21 C atoms, e.g. radicals of propanediol-1,3, 2-ethyl propanediol-1,3, neopentyl glycol, pentanediol-1,5, hexanediol-1,6, cyclohexane dimethanol-1,4,3-ethyl pentanediol-2,4,2-methyl pentanediol-2,4,2,2,4-trimethyl pentanediol-1,3,2-ethyl hexanediol-1,3,2,2-diethyl propanediol-1,3, hexanediol-2,5,1,4-di-(β-hydroxy-ethoxy)benzene, 2,2-bis-(4-hydroxycyclohexyl)propane, 2,4-dihydroxy-1,1,3,3-tetramethyl cyclobutane, 2,2-bis-(4-β-hydroxyethoxyphenyl)propane and 2,2-bis-(4- hydroxypropoxyphenyl) propane (DE-A 2 407 674, 2 407 776, 2 715 932).

The polyalkylene terephthalates may be branched by incorporating relatively small amounts of trihydric or tetrahydric alcohols or tribasic or tetrabasic carboxylic acids, e.g. according to DE-A 1 900 270 and U.S. Pat. No. 3,692,744. Examples of preferred branching agents are trimesic acid, trimellitic acid, trimethylol ethane and propane and pentaerythritol.

Polyalkylene terephthalates produced solely from terephthalic acid and reactive derivatives thereof (e.g. dialkyl esters thereof) and ethylene glycol and/or butanediol-1,4, and mixtures of these polyalkylene terephthalates, are particularly preferred.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates may be produced by known methods (e.g. Kunststoff-Handbuch, Volume VIII, page 695 et seq., Carl-Hanser-Verlag, Munich 1973).

Component E may be contained in the compositions according to the invention in a quantity of preferably 0 to 50 parts by weight, particularly preferably up to 30 parts by weight and most preferably up to 20 parts by weight, whereby the sum of all components in the composition equals 100.

Component F

The compositions may be made flame retardant by the addition of suitable additives. Halogen compounds, based in particular on chlorine and bromine, phosphorus-containing compounds and silicon compounds, in particular silicone compounds, may be cited by way of example as flame retardants.

The compositions preferably contain phosphorus-containing flame retardants from the groups of monomeric and oligomeric phosphoric and phosphonic acid esters, phosphonate amines and phosphazenes, whereby mixtures of several components selected from one or more of these groups may also be used as flame retardants. Other phosphorus compounds not specifically mentioned here may also be used alone or in any combination with other flame retardants.

Preferred monomeric and oligomeric phosphoric or phosphonic acid esters are phosphorus compounds having the general formula (IV)

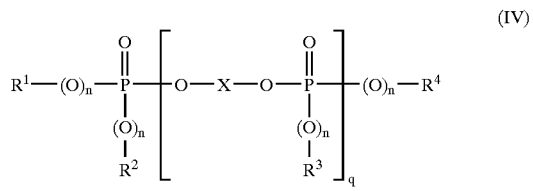

(IV)

wherein

R$^1$, R$^2$, R$^3$ and R$^4$ each mutually independently denote optionally halogenated C$_1$ to C$_8$ alkyl, C$_5$ to C$_6$ cycloalkyl, C$_6$ to C$_{20}$ aryl or C$_7$ to C$_{12}$ aralkyl, each optionally substituted by alkyl, preferably C$_1$ to C$_4$ alkyl, and/or halogen, preferably chlorine, bromine, n mutually independently denotes 0 or 1 q denotes 0 to 30 and

X denotes a mononuclear or polynuclear aromatic radical having 6 to 30 C atoms, or a linear or branched aliphatic radical having 2 to 30 C atoms, which may be OH-substituted and may contain up to 8 ether bonds.

R$^1$, R$^2$, R$^3$ and R$^4$ preferably mutually independently stand for C$_1$ to C$_4$ alkyl, phenyl, naphthyl or phenyl C$_1$–C$_4$ alkyl. The aromatic groups R$^1$, R$^2$, R$^3$ and R$^4$ may be substituted for their part with halogen and/or alkyl groups, preferably chlorine, bromine and/or C$_1$ to C$_4$ alkyl. Particularly preferred aryl radicals are cresyl, phenyl, xylenyl, propyl phenyl or butyl phenyl and the corresponding brominated and chlorinated derivatives thereof.

X in formula (IV) preferably denotes a mononuclear or polynuclear aromatic radical with 6 to 30 C atoms. This preferably derives from diphenols having formula (I).

n in formula (IV) may mutually independently be 0 or 1, whereby n preferably equals 1.

q stands for values from 0 to 30. If mixtures of different components having formula (IV) are used, mixtures preferably having number-averaged q values of 0.3 to 20, particularly preferably 0.5 to 10, in particular 0.5 to 6, most particularly preferably 0.6 to 2, maybe used.

X particularly preferably stands for:

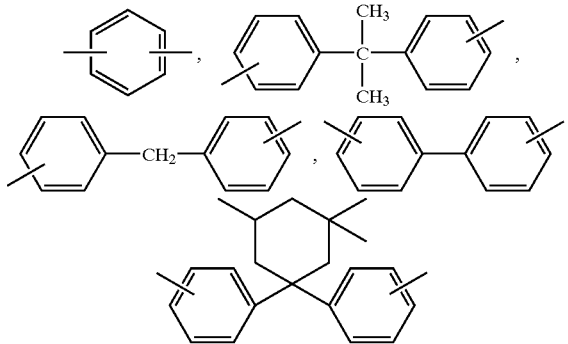

or chlorinated or brominated derivatives thereof, in particular X derives from resorcinol, hydroquinone, bisphenol A or diphenyl phenol. X particularly preferably derives from bisphenol A.

Monophosphates (q=0), oligophosphates (q=1–30) or mixtures of monophosphates and oligophosphates may be used as component F according to the invention.

Monophosphorus compounds having formula (IV) are in particular tributyl phosphate, tris-(2-chloroethyl)phosphate, tris-(2,3-dibromopropyl)phosphate, triphenyl phosphate, tricresyl phosphate, diphenyl cresyl phosphate, diphenyl octyl phosphate, diphenyl-2-ethyl cresyl phosphate, tri-(isopropyl phenyl)phosphate, halogen-substituted aryl phosphates, methyl phosphonic acid dimethyl ester, methyl phosphenic acid diphenyl ester, phenyl phosphonic acid diethyl ester, triphenyl phosphine oxide or tricresyl phosphine oxide.

The phosphorus compounds according to component F are known (cf. e.g. EP-A 0 363 608, EP-A 0 640 655) or may be produced by known methods in an analogous way (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

The average q values may be determined by determining the composition of the phosphate mixture (molecular weight distribution) by a suitable method (gas chromatography (GC), high-pressure liquid chromatography (HPLC), gel permeation chromatography (GPC)) and using it to calculate the average values for q.

Phosphonate amines and phosphazenes may also be used as flame retardants.

The flame retardants may be used alone or in any mixture with one another or in combination with other flame retardants.

Component F may be contained in the composition according to the invention in a quantity of preferably 1 to 40 parts by weight, particularly preferably 2 to 30 parts by weight and most preferably 2 to 20 parts by weight, whereby the sum of the parts by weight of all components in the composition equals 100.

Component G

The flame retardants according to component F are often used in combination with so-called anti-dripping agents, which reduce the tendency of the material to form burning drips in the event of a fire. Compounds from the substance classes of fluorinated polyolefins, silicones and aramid fibres may be cited here by way of example. These may also be used in the compositions according to the invention. Fluorinated polyolefins are preferably used as anti-dripping agents.

Fluorinated polyolefins are known and described for example in EP-A 0 640 655. They are sold by DuPont, for example, under the brand name Teflon® 30N.

The fluorinated polyolefins may be used both in pure form and in the form of a coagulated mixture of emulsions of the fluorinated polyolefins with emulsions of the graft polymers (component B) or with an emulsion of a copolymer, preferably on a styrene/acrylonitrile basis, whereby the fluorinated polyolefin is mixed as an emulsion with an emulsion of the graft polymer or copolymer and then coagulated.

The fluorinated polyol&fins may further be used as a pre-compound with the graft polymer (component B) or a copolymer according to E.1, preferably on a styrene/acrylonitrile basis. The fluorinated polyolefins are mixed as a powder with a powder or pellets of the graft polymer or copolymer and compounded in the melt, generally at temperatures of 200 to 330° C., in conventional units such as internal mixers, extruders or twin screws.

The fluorinated polyolefins may also be used in the form of a masterbatch, which is produced by emulsion polymerisation of at least one monoethylenically unsaturated monomer in the presence of an aqueous dispersion of the fluorinated polyolefin. Preferred monomer components are styrene, acrylonitrile and mixtures thereof. The polymer is used as a free-flowing powder after acid precipitation and subsequent drying.

The coagulates, pre-compounds or masterbatches conventionally have solids contents of 5 to 95 wt. %, preferably 7 to 60 wt. %, of fluorinated polyolefin.

Component G may be contained in the composition according to the invention in a quantity of preferably 0.05 to 10 parts by weight, particularly preferably 0.1 to 5 parts by weight and most preferably 0.3 to 5 parts by weight, whereby the actual content of fluorinated polyolefin in the composition is preferably 0.05 to 1, in particular 0.1 to 0.5 parts by weight, whereby the sum of the parts by weight of all components in the composition equals 100.

Component H (Other Additives)

The compositions according to the invention may also contain at least one of the conventional additives, such as lubricants and release agents, for example pentaerythritol tetrastearate, nucleating agents, antistatics, stabilizers, and other fillers and reinforcing agents along with dyes and pigments.

All parts by weight quoted in this application are standardised such that the sum of the parts by weight of components A) to H) in the composition equals 100.

The compositions according to the invention are produced by mixing the various constituents by known means and melt compounding and melt extruding them at temperatures of 200° C. to 300° C. in conventional units such as internal mixers, extruders and twin screws.

The individual constituents may be mixed by known means both successively and simultaneously, both at around 20° C. (room temperature) and at elevated temperature.

The molding compositions according to the invention may be used in the production of all types of molded parts. These may be produced by injection molding, extrusion and blow molding processes. A further form of processing is the production of molded parts by thermoforming from prefabricated sheets or films and by in-mold decoration (IMD).

Examples of such molded parts are films, profiles, all types of housing sections, e.g. for domestic appliances such as juice extractors, coffee machines, mixers; for office equipment such as monitors, printers, copiers; interior and exterior automotive parts; plates, pipes, electric wiring ducts, windows, doors and other profiles for the construction sector (interior fittings and exterior applications) and electrical and electronic components such as switches, plugs and sockets.

The molding compositions according to the invention may in particular also be used to produce the following molded parts, for example:

Interior fittings for rail vehicles, ships, aircraft, buses and other motor vehicles, exterior automotive body parts, housings for electrical appliances containing miniature transformers, housings for information processing and transfer equipment, housings and cladding for medical instruments, massage equipment and housings, toy vehicles for children, two-dimensional prefabricated wall panels, housings for safety equipment, heat-insulated transport containers, equipment for handling or caring for small animals, molded parts for sanitary and bathroom equipment, covering grid plates for ventilator openings, molded parts for garden sheds and tool sheds, housings for gardening implements.

The present invention therefore also provides a process for producing the composition, its use in the production of molded parts, sheets or films, and the molded parts, sheets or films themselves.

The following examples are intended to illustrate the invention in more detail.

EXAMPLES

Components

A: Linear PC based on BPA with a relative solution viscosity of 1.28, measured in $CH_2Cl_2$ as solvent at 25° C. and at a concentration of 0.5 g/100 ml.

B: AES blend (Blendex® WX 270 Ube Cycon Ltd., Tokyo, Japan).

C-W1: Wollastonite with a C content of 0.49 wt. % and a $d_{50}$ of 4.8 µm and an aspect ratio of 8:1 (Nyglos® 4 10992 NYCO Minerals Inc., Willsboro, N.Y. (USA).

C-W2: Wollastonite with a C content of <0.1 wt. % and a $d_{50}$ of 6.5 µm and an aspect ratio of 8:1 (Nyglos® 4, NYCO Minerals Inc., Willsboro, N.Y. (USA).

C-T: Naintsch A3 (Naintsch Mineralwerke GmbH, Graz, Austria), talc with an mean particle diameter ($d_{50}$) of 1.2 µm according to information from the manufacturer.

E: Styrene/acrylonitrile copolymer with a ratio by weight of styrene to acrylonitrile of 72:28 and an intrinsic viscosity of 0.55 dl/g (measured in DMF at 20° C.).

D: Poly R® 10 (Pitco Industries N.V., Netherlands), Polybutene Oil, $\overline{M}n$=1000 g/mol (GPC).

H: Conventional release agent and an antioxidant, neither of which are believed critical to the invention.

The components are mixed in a 3-1 internal mixer. The moldings are produced on an Arburg 270E injection molding machine at 260° C.

The carbon content of the wollastonites is determined by elemental analysis. A 24-hour extraction of wollastonite C-W1 with chloroform yielded only the following amount of extracted substance (relative in each case to the total amount of wollastonite originally used:

C-W1: 0.06 wt. %

This value proves that the carbon is chemically bonded carbon, so there is no physical mixture of mineral and a carbon-containing compound.

In order to determine the rubber-glass transition temperature the notch impact resistances $a_k$ are measured and evaluated at various temperatures. To this end the test temperature is lowered in 5° steps, starting from room temperature, until a brittle fracture is observed.

The modulus of elasticity and the elongation at break are determined in a tensile test according to ISO 527.

The longitudinal and transverse coefficient of linear and thermal expansion (CLTE 1/t) is determined according to ASTM E 831.

TABLE 1

| Components (parts by wt.) | Example 1 | 2 | Comp. 1 | Comp. 2 | Comp. 3 | Comp. 4 |
|---|---|---|---|---|---|---|
| A | 50.54 | 52.84 | 50.54 | 52.84 | 50.54 | 52.84 |
| B | 15.69 | 16.39 | 15.69 | 16.39 | 15.69 | 16.39 |
| D | 20.91 | 21.88 | 20.91 | 21.88 | 20.91 | 21.88 |
| C-W1 | 7.35 | 7.69 | | | | |
| C-W2 | | | 7.35 | 7.69 | | |
| C-T | | | | | 7.35 | 7.69 |
| D | 4.31 | | 4.31 | | 4.31 | |
| H | 1.2 | 1.2 | 1.2 | 1.2 | 1.2 | 1.2 |
| Modulus of elasticity [MPa] | 2571 | 2770 | 2564 | 2637 | 2652 | 2893 |
| Elongation at break [%] | 66.4 | 61.4 | 44.1 | 60.2 | 29.0 | 35.1 |
| Rubber/glass transition [° C.] | −10 | −5 | −5 | −5 | −5 | −5 |
| CLTE 1/t* | 83/106 | 77/112 | 85/111 | 80/105 | 81/104 | 82/95 |

*CLTE 1/t = coefficient of linear and thermal expansion, longitudinal/transverse [ppm/K]

As maybe seen from the tests, the best notch impact resistance—expressed by the lowest rubber/glass transition—for a mineral-filled molding composition is achieved with the combination of the claimed wollastonite and the additive D (Example 1), with high elongation at break at the same time. The modulus of elasticity is constant within the limits of experimental measuring accuracy (+−100 MPa).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising:
    A) polycarbonate and/or polyester carbonate
    B) graft polymer based on ethylene-α-olefin rubber as graft base,
    C) wollastonite having carbon content greater than 0.1% relative to the weight of the wollastonite determined by elemental analysis and
    D) at least one additive, selected from the group consisting of triglyceride, aliphatic saturated hydrocarbon and aliphatic unsaturated hydrocarbon.

2. The composition of claim 1 wherein the carbon content is 0.2 to 2 wt. %.

3. The composition of claim 1 wherein the carbon content is 0.3 to 1 wt. %.

4. The composition of claim 1 wherein the carbon content is 0.3 to 0.6 wt. %.

5. The composition according to claim 1, wherein
    A) is present in an amount of 30 to 85 parts by weight,
    B) is present in an amount of 1 to 50 parts by weight,
    C) is present in an amount of 2 to 20 parts by weight, and
    D) is present in an amount of 0.1 to 25 parts by weight,
    wherein the sum of the parts by weight equals 100.

6. The composition according to claim 1, wherein component B) is a graft polymer of at least one vinyl monomer on one or more graft bases based on ethylene-α-olefin rubber, the rubber having glass transition temperatures of <0° C.

7. The composition. according to claim 3, wherein component B) is a graft polymer of:
    1) 50 to 99 wt. % (relative to 1)) of at least one monomer selected from a first group consisting of vinyl aromatics, ring-substituted vinyl aromatics and (meth) acrylic acid ($C_1$–$C_8$) alkyl esters and 1 to 50 wt. % (relative to 1)) of at least one monomer selected from a second group consisting of vinyl cyanides, (meth) acrylic acid ($C_1$–$C_8$) alkyl esters and derivatives of unsaturated carboxylic acids , on
    2) one or more graft bases based on ethylene-α-olefin rubber having glass transition temperatures of <−40° C.

8. The composition according to claim 7, wherein the first group consists of styrene, α-methyl styrene and methyl methacrylate and the second group consists of acrylonitrile, maleic anhydride and methyl methactylate.

9. Composition according to claim 6, wherein the graft base is an EP(D)M rubber.

10. The composition according to claim 1, wherein D) is at least one member of the group consisting of triglycerides with 12 to 35 carbon atoms,
    aliphatic saturated hydrocarbon having number average molecular weights of 300 to 50,000.
    and aliphatic unsaturated hydrocarbons having number average molecular weights of 300 to 50,000.

11. Composition according to claim 1, comprising:
    35 to 80 parts by weight of A),
    2 to 35 parts by weight of B),
    3 to 18 parts by weight of C) and
    1 to 15 parts by weight of D)
wherein the sum of the parts by weight equals 100.

12. The composition according to claim 1, further comprising at least one member selected from the group consisting of vinyl (co)polymers, polyalkylene terephthalates, flame retardants lubricants, release agents, nucleating agents, anti-dripping agents, antistatics, stabilizers, fillers, reinforcing agents, dyes and pigments.

13. The composition according to claim 12, wherein flame retardant is at least one compound conforming to formula (IV):

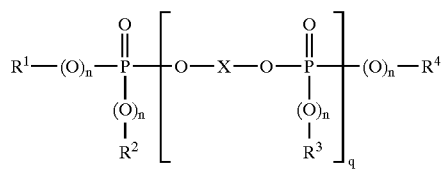

(IV)

wherein

R$^1$, R$^2$, R$^3$ and R$^4$ independently one of the others denote C$_1$ to C$_8$ alkyl, C$_5$ to C$_6$ cycloalkyl, C$_6$ to C$_{20}$ aryl or C$_7$ to C$_{12}$ aralkyl, n independently one of the others denotes 0 or 1 q denotes 0 to 30 and

X denotes a mononuclear or polynuclear aromatic radical having 6 to 30 C atoms, a linear or branched aliphatic radical having 2 to 30 C atoms.

14. The composition according to claim 13, wherein: X in formula (IV) denotes:

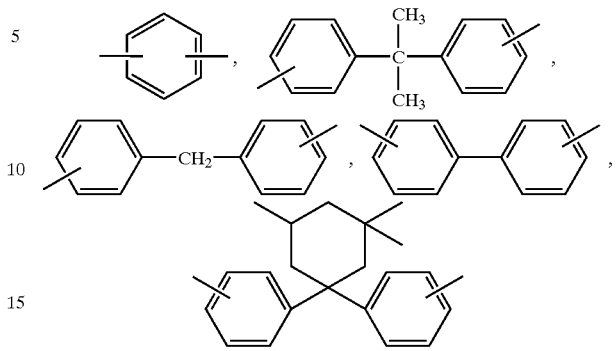

or chlorinated or brominated derivatives thereof.

15. A molded article comprising the composition of claim 1.

* * * * *